MAGNETIC MEMORY TECHNIQUE

Filed Sept. 23, 1958 2 Sheets-Sheet 1

*INVENTOR.*
ANDREW H. ESCHENFELDER

*BY* William V. Schelberg
AGENT

United States Patent Office 3,077,584

Patented Feb. 12, 1963

3,077,584

MAGNETIC MEMORY TECHNIQUE

Andrew H. Eschenfelder, Poughkeepsie, N.Y., assignor to International Business Machines Corporation, New York, N.Y., a corporation of New York Filed Sept. 23, 1958, Ser. No. 762,812
15 Claims. (Cl. 340—174)

This invention relates to magnetic memory devices and more particularly to an improved method of and means for deriving information from a random access magnetic memory device.

A random access magnetic memory has been described in an article by Jay W. Forrester, in the Journal of Applied Physics, January 1951, page 44, entitled, "Digital Information Storage in Three Dimensions Using Magnetic Cores," wherein each of the cores must be capable of attaining bistable states of flux density in representing binary information and is switched from one to another of these bistable states by the coincidence of current pulses applied to suitable driving windings. The output signals obtained when any one of these cores is interrogated depends upon the magnitude of the time and rate of flux change which takes place within the material of the core. The time rate of flux change in turn is dependent upon the total flux within the material, the coercive force of the material (H*c*) and the switching parameter of the material (S*w*).

Each of the factors upon which the output signals depend varies from core to core due to the difficulties in maintaining perfectly uniform magnetic properties in the cores, the variations in geometrical properties such as mean diameter and cross-sectional area of the cores and temperature variations. When magnetic material experiences increases in temperature, a continuous decrease in flux density, coercive force, and the value of the switching parameter S*w* is experienced, which decrease to zero at the Curie temperature. This temperature effect is described in a book entitled "Ferromagnetism" by Richard M. Bozorth, published by the D. Van Nostrand Company, Inc., and more specifically on pages 713–715, with a table of approximtae values of the Curie point temperatures given for various elements and compounds on page 723.

Since the magnetic memory matrices employed in today's electronic computers must be capable of operating at ever higher speeds to store and read out information, faster switching speeds are desirable. The cores in such high-speed memories traverse their hysteresis loop many times over within short intervals of time to produce large quantities of heat due to internal losses as the magnetic domains within the material are reversed in direction with the heat generated being proportional to the switching current applied times the switching voltage across the windings.

Heating of the cores causes increased switching speed since both switching parameter and coercive force decrease. As a result, the outputs initially increase but then decrease because of the marked decrease in flux density (B) with increased temperature, especially close to the Curie temperature. In order to maintain output signals which may be readily discriminated against, a fixed base signal is utilized to determine wanted and unwanted signal output and means, such as air cooling or immersion of the cores in a suitable bath, have been employed to maintain the cores near room temperature with materials having a relatively high Curie temperature.

In order to attain increased switching speeds, it is preferable to use low Curie temperature materials and the need for a novel means for discriminating wanted and unwanted signals is apparent. This invention provides such novel means for interrogating magnetic memories.

It is then a broad object of this invention to provide a method and means for reading information from a magnetic matrix.

Another object of this invention is to provide a method wherein a selected core is interrogated twice within a reading cycle to allow discrimination of wanted to unwanted signals based upon the characteristic of the selected core.

Still another object of this invention is to provide a double interrogation of a selected core within a reading cycle and means for comparing the outputs thus generated.

A further object of this invention is to provide a novel method and means for reading information from a coincident current type memory matrix wherein each of the binaries may have a low Curie temperature to thereby attain higher speeds of operation.

These and other objects may be realized by employing a reading method wherein a selected core, which is to be interrogated, is impressed with a field capable of saturating the core to a datum bistable state twice within a reading cycle, and providing means for comparing the output signals derived to generate their difference. Thus, the problems of considering the minimum output signal which may be obtained due to the differences in material, geometry and temperature increases, is obviated since the outputs available from the core itself are utilized rather than an external or fixed determination.

Other objects of this invention will be pointed out in the following description and claims and illustrated in the accompanying drawings, which disclose, by way of example, the principle of the invention and the best mode, which has been contemplated, of applying that principle.

Figure 1:
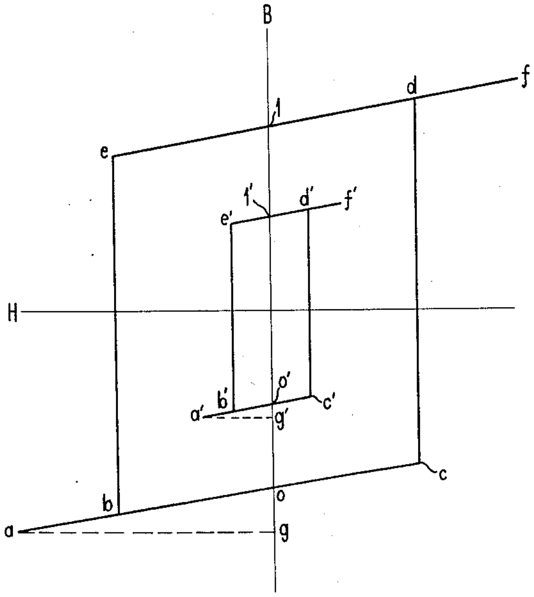
FIG. 1 is an illustration of an idealized hysteresis characteristic of the magnetic materials employed in magnetic memories.

Referring to the FIG. 1, an idealized magnetization curve is illustrated showing a plot of flux density (B) vs. applied field (H) for the type of magnetic material with which the cores are made. The opposite remanent states, designated 1 and 0 are utilized for representing binary information with the closed loop *b—c—d—e* representing a typical loop at room temperature and the loop *b'—c'—d'—e'* representing the magnetization loop for the same material at an increased temperature.

If the material of the core is in the 0 state and has a negative switching field applied, hereafter referred to as a full read signal, the material undergoes a slight transition from the 0 remanence point to point *b* and thence to a saturation point designated as *a* in the FIG. 1. A dotted line drawn from point *a* perpendicular to the vertical axis of the loop terminates at a point *g* in the FIG. 1, and the line from 0 to *g* is a measure of the total flux change which induces a voltage directly dependent upon the magnitude of this flux change on a conductor inductively linked therewith whcih output will hereinafter be referred to as a "O" output. If, however, the material is at the 1 remanent state upon application of a full read signal, the material follows the curve from the 1 state to the points *e-b-a* and the total flux change is measured on the vertical axis of the curve from the remanent 1 state to point *g* to induce an output voltage on a conductor inductively linked therewtih which is directly proportional to this total flux change and will hereinafter be referred to as a "1" output. Similarly, with reference to the smaller curve *b'-c'-d'-e'*, the flux change experienced when the core is read and is in the 0' state is measured on the vertical axis from the point 0' to the point *g'*, in distinction to the flux change measured on the vertical axis from the points 1' to *g'* when the core is in the 1' state. The difference between the flux change which takes place when the core is in 1 state and when in the 0 state upon application of a full read signal is seen to be proportionately greater in both instances. The primed, or inner, curve, when compared with the normal, or outer, curve, exhibits less coercive force with a smaller total flux change when the loop is traversed, allowing increased switching speeds with correspondingly decreased output signals.

Figure 2:
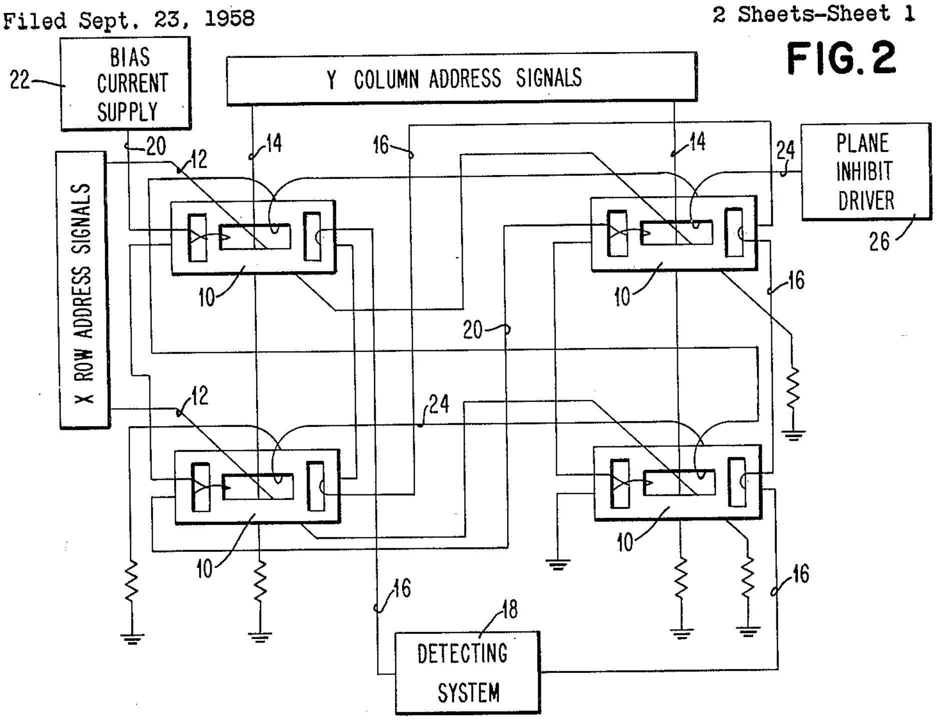
FIG. 2 is an illustration of one embodiment of this invention wherein a 2 x 2 magnetic core coincident current type memory matrix is illustrated.

Referring to the FIG. 2, a 2 x 2 memory matrix is shown having magnetic cores 10 which are arranged in columns and rows. The system shown is exemplary of the types with which this invention may be used and is more fully explained in the Samuel K. Raker Patent No. 2,923,923, which issued on February 2, 1960. Each of the cores in each row is coupled by a row driver 12 while each of the cores in each column is coupled by a column driver 14. A sense conductor 16 is coupled to each of the cores 10 which has a voltage induced thereon whenever there is a flux change, as described above, within the material linked by the conductor 16 in the cores 10. The sense conductor 16 terminates in a detecting system 18 which is adapted to detect an output indicative of a stored 1 in distinction to a stored 0. A bias conductor 20 is connected with a bias current supply 22 and links each of the cores 10. During the quiescent state, therefore, flux in the material linked by the individual loops of bias conductor 20 exist in opposite directions; flux in the remaining material, i.e. that linked by sense conductor 16, can exist in a clockwise or a counterclockwise direction depending on the storage state of the core 10. An inhibit conductor 24 also links each of the cores 10, and when energized from a plane inhibit driver 26 prevents a flux change in the cores 10 when a row driver 12 and a column driver 14 are coincidently energized. In order to store a 1, a row driver 12 and a column drive 14 must be coincidently energized by a polarity in one sense, and this 1 is read out by the coincident energization of the same row driver 12 and column driver 14 both of which have a polarity of opposite sense. The core is said to have been impressed by a full read signal, which upon termination leaves the core in the 0 remanent state.

Figure 3:
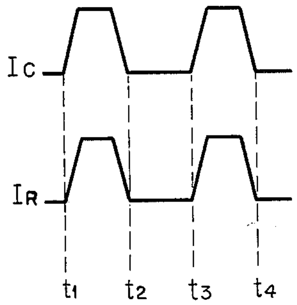
FIG. 3 illustrates the relative timing of reading current pulses which are required for operation of the circuit of FIG. 2.

The pulses occurring in the row drivers 12 and the column drivers 14 during the reading operation are illustrated in the FIG. 3 and are labeled $I_r$ and $I_c$, respectively. Instead of the normal single reading operation heretofore employed, a double reading operation takes place. Considering the above discussion with reference to the FIG. 1, upon application of the first full read signal, designated by a time $t_1$ to $t_2$ in the FIG. 3, to one of the cores 10, if the selected core is in the 0 state, a total flux change measured by the line from 0 to *g* on the vertical axis of FIG. 1 takes place, inducing a "0" output voltage on the sense conductor 16 which is applied to the detecting system 18. Upon termination of this first full read signal and within the delay period measured by the time $t_2$ to a time $t_3$ in the FIG. 3, the core returns to 0 remanent condition. During the time interval measured by the point $t_3$ to a point $t_4$ another full read signal is applied to the same core and again the same flux change takes place to induce a further "0" output voltage of the same magnitude on the sense conductor 16, which is similarly applied to the detecting system 18. If, however, the selected core was in the 1 remanent state upon application of the first full read signal, the core is switched from the 1 toward the 0 state inducing a "1" output voltage on the sense conductor 16 which is applied to the system 18. Thus the function of the double read cycle is to initially provide either a "1" or a "0" output signal and thereafter provide a "0" output signal from the same selected core, which is applied to the system 18.

It is then the function of the system 18 to compare the first received signal output with the second received signal output and when they are equal to nullify and when unequal, provide the difference. A difference between the first and second signal to the system 18, indicates the selected core was in the 1 state, while equality indicates the core was in the 0 state. It should be pointed out that as the hysteresis loop of the material shrinks due to temperature increases, the "1" output signal remains appreciably larger than the "0" output signal thus allowing discrimination between the two on an absolute basis.

Figure 4:
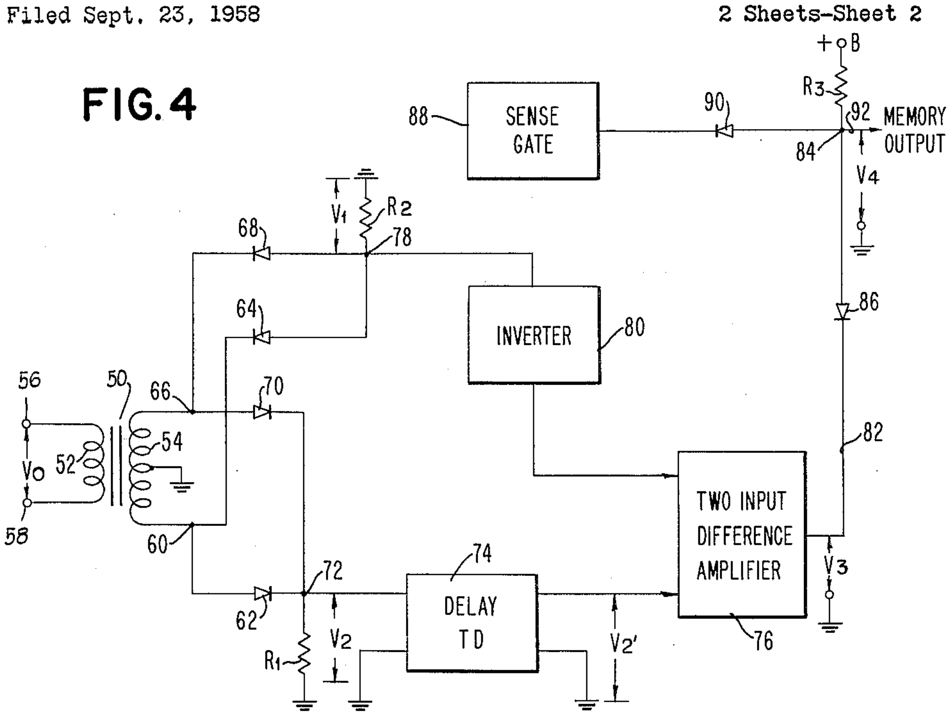
FIG. 4 is a circuit diagram of a detecting system which is utilized when employing the reading operations as shown in FIG. 3.

A typical circuit for accomplishing the results desired of the system 18 is illustrated in the FIG. 4. Referring to the FIG. 4, a transformer 50 is shown having an input winding 52 and an output winding 54. The input winding 52 has a terminal 56 and 58 which are connected to the sense conductor 16 shown in the FIG. 2. The output winding 54 is center-tapped to ground having one end connected to a terminal 60 and thence to a diode 62 and a diode 64, with the other end of the winding 54 connected to a terminal 66 and thence to a diode 68 and a diode 70. Similar ends of the diodes 62 and 70 are connected to a terminal 72 and thence to ground through resistor $R_1$ and a time delay unit 74 which is in turn connected to one input terminal of a two input difference amplifier 76. Two similar ends of the diodes 64 and 68 are connected to a terminal 78 thence to ground through a resistor $R_2$ and another input terminal of the difference amplifier 76 through an inverter unit 80. The input of the difference amplifier 76 is shown by a line 82 which is connected to a terminal 84 through a diode 86. Connected to the terminal 84 is a sense gate signal source 88 through a diode 90, a B+ bias through a resistor $R_3$ and an output signal line 92. The art is replete with time delay units, phase inversion units and difference amplifiers which may be utilized in the above-described circuit, and these devices may be constructed as described in a book entitled, "Vacuum Tube Circuits" by Lawrance B. Argumbau published by John Wiley & Sons, Inc. on page 355 for a suitable phase inverter (80); a book by the M.I.T. Radar School Staff entitled, "Principles of Radar," in pages 2–88 through 2–100; for a suitable time delay unit 74; and a book by Millman and Taub entitled "Pulse and Digital Circuits," on page 20 for a suitable difference amplifier (76).

Figure 5:
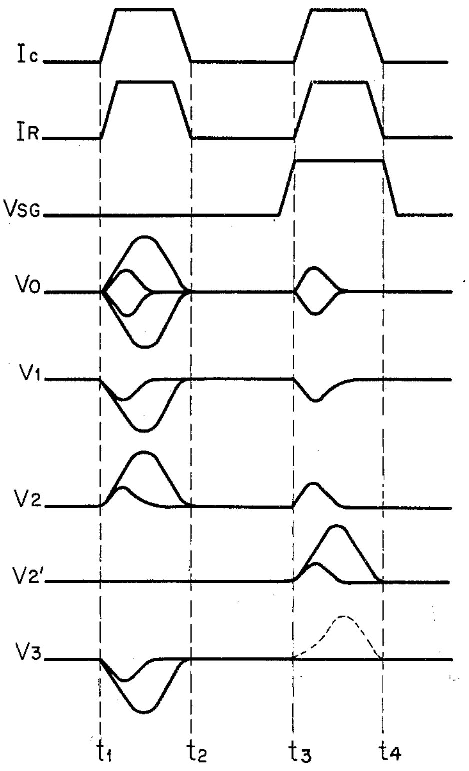
FIG. 5 is an illustration of the various voltages appearing in the circuit of FIG. 4 upon operation of the memory of FIG. 2 as indicated in FIG. 3.

The voltages appearing at various points within the circuit of FIG. 4 are shown in the FIG. 5 with reference to the $I_c$ and $I_r$ drivers and their time intervals $t_1$ through $t_4$ as illustrated in the FIG. 3. In the detailed description to follow describing the circuit operation of the FIG. 4, reference will be made to the various voltages appearing at different points within the circuit and are designated $V_0$, $V_1$, $V_2$, $V_2'$, and $V_3$ for clarity.

At the time $t_1$—$t_2$, as shown in the FIG. 5, coincident energization of a single row and column driver takes place to provide a first full read signal to a selected core. The output signal induced is impressed across the terminals 56 and 58 of the input winding 52 on the transformer 50, which is designated $V_0$. This output voltage is shown in the FIG. 5 to be either positive or negative in sense due to the bi-polarity of the sense line utilized in coincident schemes of this type to cancel half selects. Thus, depending upon which core is selected and in which manner the sense conductor links the core, the polarity is either positive or negative. Further, depending upon the state of the core at this time, i.e. in either the 1 or 0 state, a "1"

or a "0" output signal is obtained as shown by the large and small amplitude, respectively, for the voltage $V_0$. The secondary winding 54 on the transformer 50 feeds into the diodes 62, 64, 68 and 70 which make up two full wave rectifiers. The voltage appearing at the terminal 78 may be measured across the resistor $R_2$ and is designated $V_1$, while the voltage appearing at the terminal 72 may be measured across the resistor $R_1$ and is designated $V_2$. Each of the voltages $V_1$ and $V_2$ are seen to be equal and opposite in phase. The output from the upper full wave rectifier, the diodes 64 and 68, shown to be the voltage $V_1$, is applied to the difference amplifier 76 through the inverter 80 while the output from the lower full wave rectifier, the diodes 62 and 70, shown as the voltage $V_2$ is applied to the time delay unit 74. Since the difference amplifier 76 has only one input, $V_1$, applied at this time, an output, $V_3$, appears on the line 82 and is applied to one terminal of the diode 86. The diodes 86 and 90 with the source B+ operate as a gate, or an AND circuit, which requires a coincident signal applied to the diode 90 from the source 88 in order to pass a signal. As is shown in the FIG. 5, the signal from the source 88 designated as $V_{SG}$ does not appear at this time, therefore, no output signal appears on the line 92 at this time.

At the time $t_3$—$t_4$, the second full read signal is impressed upon the selected core and again an output signal, indicative of a "0" output, is impressed upon the input winding 52 of the transformer 50. This "0" output signal is transferred to the output winding 54 and rectified by the upper full wave rectifier, diodes 64 and 68, and the lower full wave rectifier, diodes 62 and 70, with the voltages $V_1$ and $V_2$ appearing across the resistors $R_2$ and $R_1$, respectively, as indicated in the FIG. 5 at this time. The output from the upper full wave rectifier, diodes 64 and 68, is applied to the difference amplifier 76 through the phase inverter 80, while simultaneously, the output signal previously applied to the time delay 74, shown in the FIG. 5 as the voltage $V_2$ at the time $t_1$ to $t_2$, is also applied to the difference amplifier 76 as is shown by the voltage $V_2'$. The two signals are compared by the difference amplifier 76 and the output voltage, appearing on the line 82 and designated $V_3$, depends upon whether the selected core was initially in the 1 or 0 state to give a "1" or "0" output when the first full read signal was applied. If the selected core was initially in the 1 state, the output on the line 82 at this time is the difference between the "1" output signal and the "0" output signal as shown by the dotted pulse signal $V_3$ from the time $t_3$ to $t_4$, while if the selected core was initially in the 0 state, the output on the line 82 is as indicated by the zero amplitude line for $V_3$. The output appearing on the line 82 is applied to the diode 86, and since, as shown in the FIG. 5, the sense gate has operated at a time just prior to $t_3$ and is applied to the diode 90, the output on the line 82 is reflected in the output line 92 and is essentially represented by the voltage $V_3$ as previously described.

The output from the lower full wave rectifier, the diodes 62 and 70, shown as the voltage $V_2$ from the second full read output, is applied to the time delay 74 and is applied to the difference amplifier 76 delayed by an interval measured by the time $t_2$ to $t_3$. Since there is an absence of output signal to the winding 52 at this time, the signal from the delay 74 is passed by the amplifier 76 to the output line 82, but, since the sense gate pulse source 88 is off at this time, there is an absence of signal to the output line 92.

From the discussion above, it is observed that with the novel reading and sensing method and means disclosed, the hysteresis characteristic of the magnetic material need not exhibit the sharp knee required of coincident current selection schemes and the loop may be distorted, but it is important that the *Br/Bs* ratio be as high as possible so that a "1" output may be distinguished from a "0" output. Further, by decreasing the Curie temperature of the cores and maintaining a given temperature range, smaller switching currents are possible and faster switching speeds obtainable. Means for selecting a column and a row driver are not shown herein since such systems are well known and referred to in the application of Samuel K. Raker previously cited herein. The circuitry for applying the specific short column and row drive pulses are not shown but may be constructed in a variety of ways as is described for example in the book, "Principles of Radar," previously referred to, on pages 6–2 to 6–18. Further, these means and circuits are not required for an understanding of this invention.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. An apparatus for storing binary information and for retrieving the same, comprising, a magnetic core capable of attaining a first and a second remanent state of flux density, an output winding on said core, winding means coupled with said core for saturating said core in one of said stable states when energized by a full read signal, means for applying a first and a second full read signal to said winding means whereupon a first and a second output is sequentially produced in said output winding, and means coupled with said output winding for comparing said first and second output and generating their difference.

2. An apparatus for storing binary pulse information magnetically and for thereafter retrieving the same comprising, a bistable magnetic core, control winding means and a sense winding on said core, means selectively energizing said control winding means for switching said core from a datum to an opposite stable state, said means including means for thereafter sequentially energizing said control winding means in an opposite sense to cause said core to be saturated in said datum stable state in both a first and a second time interval to cause a first and a second sequential output signal to be developed in said sense winding, and comparison means coupled with said sense winding for comparing said first and second output signals and generating their difference.

3. An apparatus for registering pulse information magnetically by a transmission of electrical impulses, comprising a plurality of bistable magnetic cores each linked with a plurality of windings including a common sense winding, means for selectively applying said impulses to a pair of said windings to jointly cause one of said cores to assume a first stable state, said means including further means for thereafter applying a first and a second group of said impulses in opposite sense to said pair of windings, displaced in time, wherein each group of said first and second impulses causes said one core to be saturated in a second stable state developing a first and a second sequential output signal in said common sense winding, and means coupled with said common sense winding for comparing said first and second sequential output signals to generate their difference.

4. An apparatus as set forth in claim 3, wherein said means coupled with said common sense winding includes means for delaying at least said first output signal.

5. An apparatus as set forth in claim 3, wherein said means coupled with said common sense winding compares the amplitude of said first and second output signals.

6. An apparatus as set forth in claim 3 including gating means coupled to said last mentioned means for gating said generated difference with said second group of impulses.

7. A magnetic memory matrix comprising, a plurality of magnetic cores capable of attaining bistable states of remanent flux density, a sense winding coupled to all of said cores, means to drive desired ones of said cores from one stable state to magnetic saturation in an opposite stable state, said means including further means for thereafter interrogating said cores and driving desired ones of said cores to magnetic saturation in said one stable state in both a first and a second sequential time interval to develop a first and a second sequential output signal in said sense winding, and comparison means coupled to said sense winding adapted to compare said first and second output signals and generate their difference.

8. A magnetic memory matrix comprising a plurality of magnetic cores capable of attaining bistable states of remanent flux density, a common sense winding coupled to all of said cores, means to drive at least one of said cores from one stable state to magnetic saturation in an opposite stable state, said means including further means for thereafter interrogating said cores by sequentially driving said one of said cores to magnetic saturation in said one state in both a first and a second sequential interval of time to provide a first and a second output signal, displaced in time, to be developed in said common sense winding, and means including delay means coupled with said common sense winding adapted to compare said first and second output signals and generate their difference.

9. A magnetic memory matrix comprising, a plurality of magnetic multipath cores made of material capable of attaining bistable states of remanent flux density, a common sense winding coupled to all of said cores, means to drive the path linked by said common sense winding in at least one of said cores from one stable state to magnetic saturation in an opposite stable state, said means including further means for thereafter driving the path linked by said common sense winding in said one core to magnetic saturation in said one stable state in both a first and a second interval of time developing a first and a second output signal, displaced in time, in said common sense winding, and means coupled to said common sense winding adapted to compare said first and second output signals and generate their difference.

10. A magnetic memory matrix as described in claim 9, wherein said means coupled with said common sense winding compares the amplitude of said first and second output signals.

11. A magnetic memory matrix as set forth in claim 10, wherein said means coupled with said common sense winding includes means for delaying at least said first output signal.

12. In combination with a magnetic memory matrix of the type including a plurality of cores made of magnetic material capable of attaining bistable states of remanent flux density, said cores arranged in columns and rows, a plurality of column conductors each coupling all the cores in different columns, a plurality of row conductors each coupling all the cores in different rows, means to selectively energize a row and a column conductor to switch a selected core coupled to said row and column conductor from one stable state to another, and a sense conductor coupled to all of the cores, a system for interrogating a core wherein a row and a column conductor coincidentally energized saturates a selected core in a datum bistable state to constitute a full read signal, comprising means for energizing said row and column conductors to apply a first and a second sequential full read signal to a selected core, and means coupled to said sense conductor adapted to produce an output indicative of a difference between the sequential outputs obtained upon application of said first and second full read signal.

13. In combination with a magnetic memory matrix of the type including a plurality of cores made of magnetic material capable of attaining bistable states of remanent flux density, said cores arranged in columns and rows, a plurality of column conductors each coupling all the cores in different columns, a plurality of row conductors each coupling all the cores in different rows, means selectively energizing a row and a column conductor for switching a selected core coupled to said row and column conductor from one stable state to another, and a sense conductor coupled to all of said cores, a system for interrogating a core wherein a full read signal is constituted by the coincident energization of a row and a column conductor which saturates a selected core in a datum bistable state, comprising means selectively energizing said row and column conductors for sequentially applying a first and a second full read signal to a selected core to produce a first and a second output in said sense conductor, means for delaying at least said first output signal coupled with said sense conductor, and further means coupled with said sense conductor adapted to compare said first and second output signals and generate their difference.

14. A system as set forth in claim 13, wherein said latter means compares the amplitudes of said first and second output signal.

15. A system as set forth in claim 13, including a gating means coupled to said latter means for gating the difference signal of said first and second output signal with said second full read signal.

References Cited in the file of this patent

UNITED STATES PATENTS

| | | |
|---|---|---|
| 2,819,456 | Stuart-Williams | Jan. 7, 1958 |
| 2,845,611 | Williams | July 29, 1958 |
| 2,949,542 | Wiseman | Aug. 16, 1960 |

UNITED STATES PATENT OFFICE
CERTIFICATE OF CORRECTION

Patent No. 3,077,584 February 12, 1963

Andrew H. Eschenfelder

It is hereby certified that error appears in the above numbered patent requiring correction and that the said Letters Patent should read as corrected below.

Column 1, line 42, for "approximtae" read -- approximate --; column 2, line 71, for "whcih" read -- which --; column 3, line 6, for "therewtih" read -- therewith --; column 6, line 71, after "3" insert a comma; column 7, line 21, after "one" insert -- stable --.

Signed and sealed this 7th day of April 1964.

(SEAL)
Attest:

ERNEST W. SWIDER
Attesting Officer

EDWARD J. BRENNER
Commissioner of Patents